(12) United States Patent
Weiler et al.

(10) Patent No.: US 7,451,520 B2
(45) Date of Patent: *Nov. 18, 2008

(54) WIPER BLADE TO CLEAN WINDSHIELDS, IN PARTICULAR OF AUTOMOBILES

(75) Inventors: Michael Weiler, Karlsruhe (DE); Joachim Zimmer, Sasbach (DE); Jan Dietrich, Buehl (DE)

(73) Assignee: Robert Bosch GmbH (DE)

( * ) Notice: Subject to any disclaimer, the term of this patent is extended or adjusted under 35 U.S.C. 154(b) by 296 days.

This patent is subject to a terminal disclaimer.

(21) Appl. No.: 10/371,806

(22) Filed: Feb. 21, 2003

(65) Prior Publication Data

US 2003/0159229 A1    Aug. 28, 2003

(30) Foreign Application Priority Data

Feb. 22, 2002    (DE) ................................ 102 07 706

(51) Int. Cl.
    *B06S 1/38*    (2006.01)
(52) U.S. Cl. .............................. 15/250.201; 15/250.48; 15/250.452
(58) Field of Classification Search ............ 15/250.201, 15/250.42–250.44, 250.451, 250.452, 250.48, 15/250.361, 250.32
    See application file for complete search history.

(56) References Cited

U.S. PATENT DOCUMENTS

| 3,088,155 | A | * | 5/1963 | Smithers ................ 15/250.201 |
| 3,881,214 | A | | 5/1975 | Palu |
| 6,944,905 | B2 | * | 9/2005 | De Block et al. ........ 15/250.201 |
| 7,007,339 | B2 | * | 3/2006 | Weiler et al. ............ 15/250.201 |
| 2003/0014828 | A1 | * | 1/2003 | Edner-Walter et al. . 15/250.201 |

FOREIGN PATENT DOCUMENTS

| DE | 1 505 397 | 10/1969 |
| DE | 100 26 419.0 | 5/2000 |
| DE | 100 07 800 | 8/2001 |
| GB | 2 106 775 | 4/1983 |
| GB | 2 145 928 | 4/1985 |
| WO | WO 01/51324 | 7/2001 |

* cited by examiner

*Primary Examiner*—Shay L Karls
(74) *Attorney, Agent, or Firm*—Michael Best & Friedrich LLP

(57) ABSTRACT

A wiper blade is proposed with which to clean windshields, in particular of automobiles. The wiper blade (10) has an elongated belt-shaped, flexible spring support element (12), with a separate first component designed as an elastic rubber wiper strip (14) that can be pressed against the windshield (20) located at the bottom belt surface (13) of the support element and with a separate second component located at the other upper belt surface (11) of the support element (12) that is designed as a wind deflection strip (24) that extends at least along a longitudinal section of the wiper blade (10). A particularly low-disruption wiper blade results if the two components (14, 24) are connected together at their sides facing one another.

15 Claims, 3 Drawing Sheets

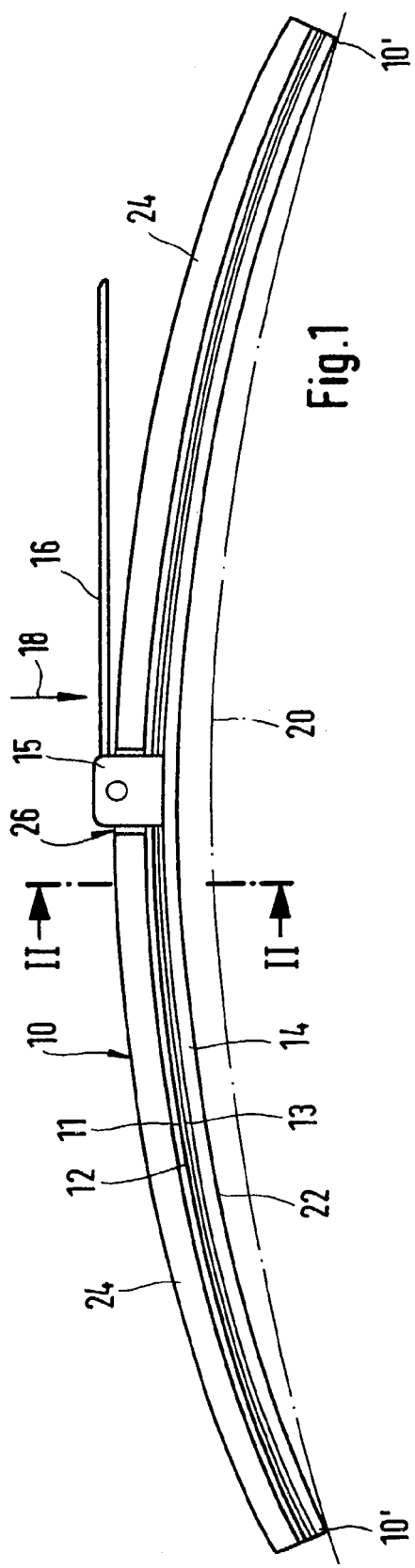
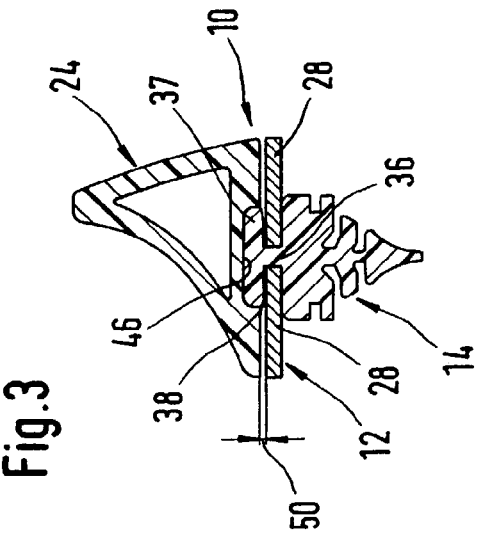
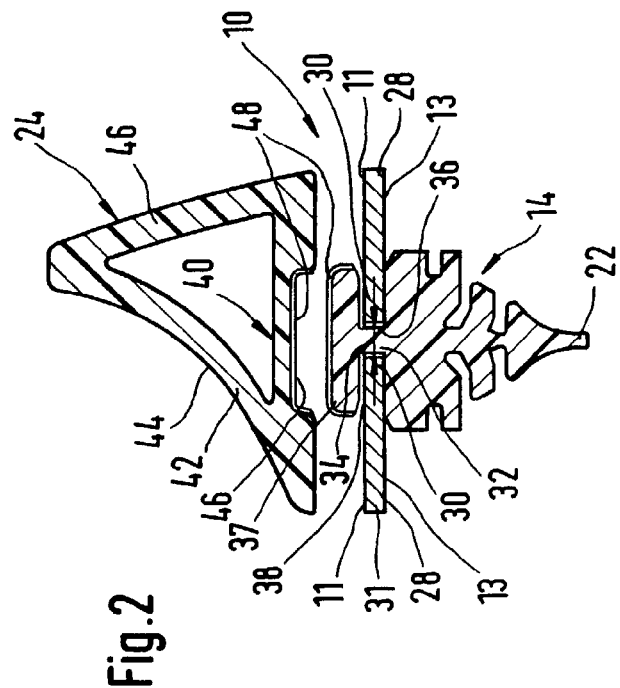

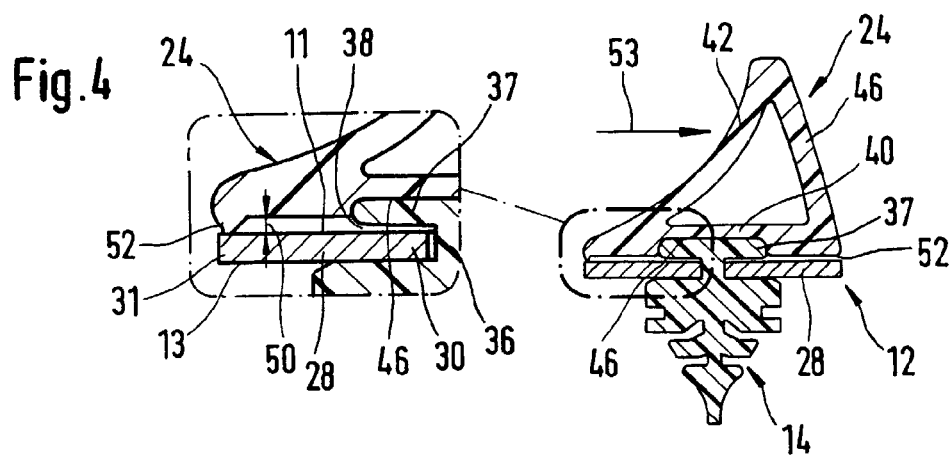
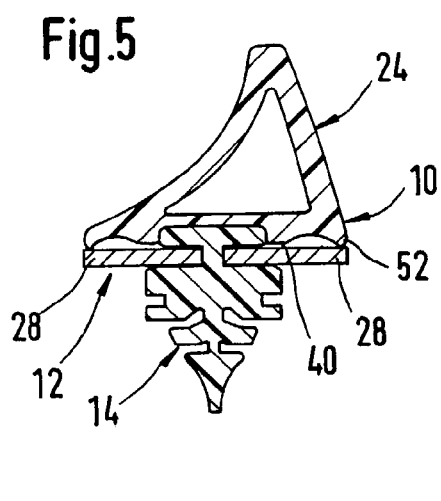
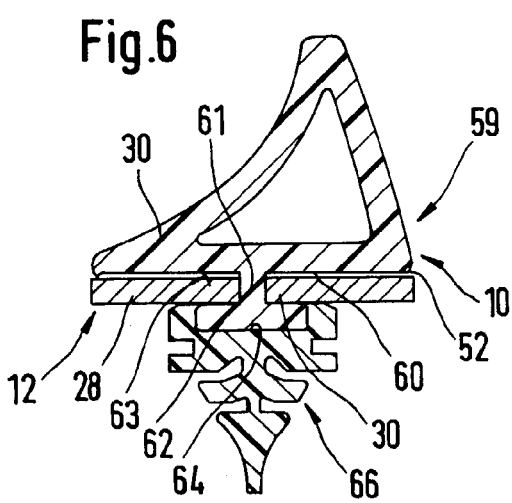
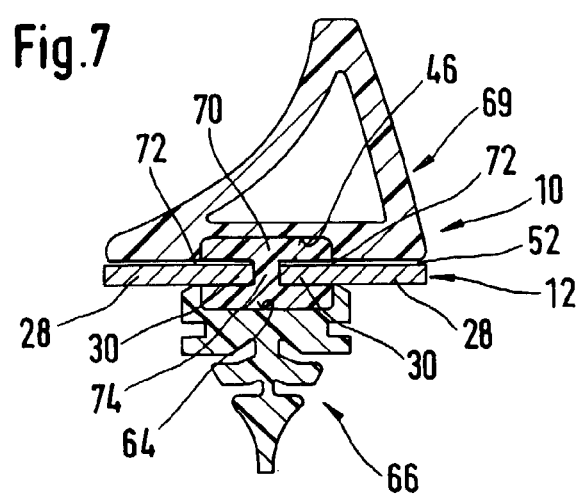

ated by the support element. When the wiper blade is

WIPER BLADE TO CLEAN WINDSHIELDS, IN PARTICULAR OF AUTOMOBILES

PRIOR ART

In wiper blades that are, instead of the so-called stirrup system (DE1,505,397), provided with an elongated belt-shaped, flexible spring support element for the purposes of distributing a force originating from the wiper arm so as to properly press the wiper strip against the windshield to be wiped, the unloaded support element must exhibit a specific natural curvature that is greater than the largest curvature in the wipe field of the windshield to be wiped. When the wiper blade is pressed against the windshield, it first touches the vehicle windshield (20) at the two ends 10' of its wiper strip only (FIG. 1). Under the effect of a force originating from the wiper arm, the entire length of the wiper strip is then pressed against the windshield, wherein the support element is placed under tension. This tension must exist along the entire wipe field passed over by the wiper blade—within certain limits—, even if the radii of curvature of spherically curved vehicle windshields change at each position of the wiper blade.

If a known wiper blade of the type identified in the preamble of claim 1 of 100 26 419.0 is moved along the uneven spherically curved windshield and the wiper blade is deformed from an operating position that approaches its outstretched position—near the center of the windshield to be wiped—to its maximum curved operating position—near the edges of the windshield—under the pressure of the support element or due to the surface of the windshield, a relative motion results in the longitudinal direction between the belt surface of the support element and the surface of the wind deflection strip pressed against it, leading to tensions in the wiper blade. These tensions can negatively impact the wipe results and moreover can result in undesirable squeaking noises during wiper operation due to the generation of a braking effect at the flexible rails that disrupts this relative motion, caused by the friction of the material needed to make up the wind deflection strip, which is unfavorable with respect to the flexible rails. Since these undesirable effects also can occur between the wiper strip and the support element and can only be eliminated or lessened through suitable measures, the friction between the support element and the wind deflection strip increases the disadvantages illustrated.

SUMMARY OF THE INVENTION

In the wiper blade according to the invention, contact between the wind deflection strip and the support element can be prevented or at least greatly reduced, since the wind deflection strip is not connected to the support element, but is connected directly to the wiper strip and held there.

If the support element of the wiper blade has two flexible rails spaced apart from one another, an invisible, integrated connection between the two components results—wiper strip and wind deflection strip—by the fact that these components are connected to one another via the longitudinal slot remaining between the flexible rails.

This can be accomplished cost-effectively by extending one of the two components that has a stem-like continuation along the longitudinal slot to the belt surface of the support element that is opposite to it, and furthermore since the connection of the two components with one another is realized at the continuation.

In order to ensure a stabile connection between the two components when operating of the wiper blade, and one that is able to handle any high loads that may occur, it is useful if the continuation of one component has a profile shape as seen in cross section, with which a mating profile shape of the other component is associated that is matched with the first, as seen in cross section.

According to an advantageous development of the invention, the stem-like continuation is placed at a wall of the wiper strip that faces the flexible rails, wherein the continuation widens into a belt shape after penetrating the longitudinal slot, forming longitudinal holding slots for the flexible rail, and covers the inner strip edges of the flexible rails that face one another.

For manufacturing reasons, it has been shown to be advantageous if the belt-like broadening of the continuation is designed to be a positive profile shapes to which a negative profile shape is snugly matched at the wind deflection strip, said negative profile shape being designed as a notched recess, and moreover if the notched recess is designed at a wall of the wind deflection strip that faces the flexible rails.

In certain applications it can be useful if the continuation is placed at a wall of the wind deflection strip that faces the flexible rails, wherein the continuation broadens into a belt after it penetrates the longitudinal slot and reaches under the inner strip edges of the flexible rails that face one another, the belt-like broadening of the wind deflection strip continuation then contributing to the securing of the wiper strip to the support element.

Advantages result with respect to a stabile connection between the wiper strip and the wind deflection strip if for one thing the belt-like broadening of the continuation creates a positive profile shape with which a negative profile shape fashioned as a notched recess is associated that is matched with the wiper strip, and furthermore if the notched recess is designed at a wall of the wiper strip that faces the flexible rails.

In a further development of the invention, a separate, third bar-shaped component is provided to connect the wiper strip to the wind deflection strip, said component being provided with a longitudinal notch at each of two longitudinal sides opposite one another, said notches lying in a common plane for the purposes of holding the inner strip edges of the flexible rails that face one another. Between these notches remains a stem whose width is matched with the slot width. The width of the longitudinal notches is matched to the thickness of the flexible rails. The two other longitudinal sides of the bar-shaped component form positive profile shapes with which negative profile shapes associate that fit both into the wiper strip as well as into the wind deflection strip. This third component is connected first to either the wiper strip or to the wind deflection strip, thereby becoming part of this component, which is then connected to the other component. The advantage of this further development can be seen in that each of these components can be manufactured without having to compromise on the material that is suited optimally for meeting the requirements placed on each component. In particular, the material to be used for the third bar-shaped component can constitute an especially good slip partner to the material of the flexible rails of the support element.

In a continuation of the conceptual idea of the invention, the external strip edges, which face away from one another, of the two flexible rails of the support element protrude at least part of the way out from the longitudinal notches that hold them, wherein an air gap remains between the flexible rails and the wall of the wind deflection strip that directly faces it. This configuration of the wiper blade permits the complete elimination of any contact between the support element and the wind deflection strip and thus also completely eliminates the disadvantages referred to above in the fastening of the wind deflection strip to the support element.

At particularly strong loads of the wind deflection strip, for example during high vehicle speeds, it can be advantageous if the wind deflection strip is supported off of knife-edge shaped stops at the support element that are placed at its two longitudinal edges. The knife-edge shape of the support stops, only one of which must be placed at the longitudinal side of the wind deflection strip that faces away from the incident surface of the wind deflection strip if desired, minimizes the size of the surface contact and thus the negative effects already described associated with it.

An especially lightweight embodiment of the wiper blade results when the wind deflection strip has two diverging sides as seen in cross section that are connected at a common base to one another. The free ends of these sides that face the support element are supported off of the support element, via knife-edge shaped stops in particular, and supplemental positive profile shapes are placed at the two elastically deflectable sides with which negative profile shapes of the wiper strip cooperate. By eliminating one wall of the wind deflection strip facing the support element, its mass and thus the mass of the wiper blade that is to be accelerated and then braked again during each wipe stroke is reduced considerably. This allows cost savings to be made in designing the individual components of the overall wiper assembly, such as the electrical drive motor and/or the pendulum gear and the like.

To connect between the wiper strip and the wind deflection strip, a latch hook is formed in this case onto the inner wall of both of the two sides, said latch hook being directed toward the outer strip edges of the support element adjacent to it and constituting the positive profile shape. An opposite hook is associated with each of the sides that is designed at the continuation of the wiper strip and that constitutes the negative profile shape.

This is especially simple to manufacture if the opposite hooks are designed at the longitudinal walls of an existing longitudinal notch in the continuation of the wiper strip.

A variation of the lightweight design of a wind deflection strip or of a wiper blade equipped with such a wind deflection strip as illustrated above provides that the wind deflection strip has two diverging sides as seen in cross section that are connected together at a common base. The free ends of the sides of the wind deflection strip that face the support element are supported off of the wiper blade, wherein at the inner wall of one of the two sides is a positive profile shape with which a negative profile shape associates that is designed into the continuation of the wiper strip.

An only arbitrarily removable connection between the wiper strip and the wind deflection strip results if in the configuration of the invention the positive profile shape that is disc or circular in cross section is connected to one side of the wind deflection strip via a narrow longitudinal stem, and furthermore if the negative profile shape is designed as a circular longitudinal notch in cross section that at its side facing the wind deflection strip is provided with a slotted longitudinal opening matched to the thickness of the longitudinal stem.

It is useful in the process to snugly match the diameter of the positive profile shape.

A permanent, easily removable shape lock between the wiper strip and the wind deflection strip is produced by making the diameter of the positive profile shape that is made of an elastic material to be smaller than the diameter of the negative profile shape, by providing the positive profile shape with a longitudinal hole and by providing a bar that is introduced into this longitudinal hole and that expands the diameter of the positive profile shape to the diameter of the negative profile shape. The pre-assembly is particularly simple as a result since the diameter difference between the negative and the positive profile shape allows the two parts to simply be pushed together. A permanent shape lock is achieved by inserting the bar into the longitudinal hole, which expands the positive profile shape to the diameter of the negative profile shape. This opens up the ability to connect the two components automatically.

So as to be able to utilize the advantages of cost-effective extrusion processes in the manufacture of the wind deflection strip and the wiper strip, the cross sections of these two components are each uniform along their entire length. Regardless of this, however, the cross sections can be subsequently partially changed if this is required for the placement of a half-coupling to the wiper blade, for example, so as to be able to connect the wiper blade to a driven wiper arm.

Further, it can be advantageous if the wind deflection strip and the wiper strip are glued together at their points of connection. The expression "bonding" stands in this case also for other connection processes such as for example vulcanization, etc.

Other advantageous further developments and configurations of the invention are provided in the following description of embodiment examples as illustrated in the associated drawing.

DESCRIPTION OF THE DRAWINGS

Shown in the drawings are:

FIG. 1—the principle representation of a wiper blade according to the invention in a side view;

FIG. 2—a section along the line II-II in FIG. 1 through the wiper blade shown in a pre-assembled position, and in an enlarged view;

FIG. 3—a section through a first embodiment of the wiper blade according to FIG. 1 along the line II-II in an enlarged view;

FIG. 4—a section according to FIG. 3 through another embodiment of the wiper blade with a detailed enlargement;

FIG. 5—a section according to FIG. 3 through another embodiment of the wiper blade;

FIG. 6—a section according to FIG. 3 through another embodiment of the wiper blade;

FIG. 7—a section according to FIG. 3 through another embodiment of the wiper blade;

DESCRIPTION OF THE EXEMPLARY EMBODIMENTS

Figure 8:
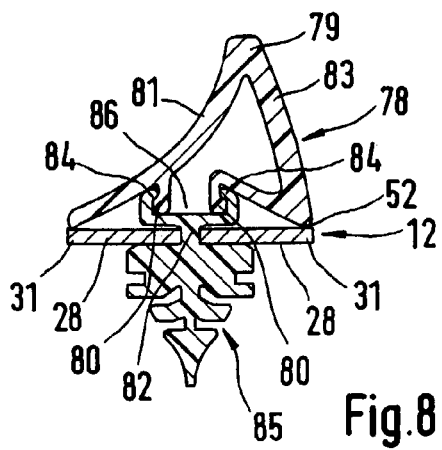
FIG. 8—a section according to FIG. 3 through another embodiment of the wiper blade.
Figure 9:
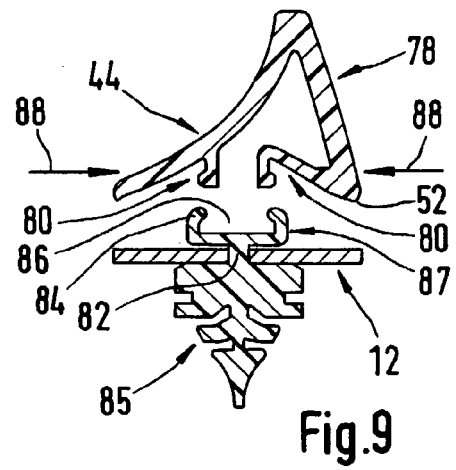
FIG. 9—the wiper blade according to FIG. 8 shown in a pre-assembled position.

A wiper blade 10 shown in FIG. 1 has an elongated belt-shaped, flexible spring support element 12 with an elongated, elastic rubber wiper strip 14 attached parallel to the longitudinal axis to its bottom belt side or surface 13 facing the windshield. At the upper belt side or surface 11 of the support element 12, which in this exemplary embodiment consists of two flexible rails, said surface facing away from the windshield, is a section 15 of a wiper blade connector that is located in the center section of the support element and connected to it. With the help of this connector, the wiper blade 10 can be removably connected in a hinged fashion to a driven wiper arm 16 that is shown partially in FIG. 1. The wiper arm 16, which moves perpendicular to its longitudinal direction in a pendulum fashion, is loaded in the direction of an arrow 18 toward the windshield to be wiped—for example toward the windshield of an automobile—the surface of which is indicated by a dot-dashed line 20 in FIG. 1. Since the line 20 represents the greatest curvature of the windshield surface, it is clear to see that the natural curvature of the as yet unloaded wiper blade 10, both of whose ends 10' sit against the windshield 20, is greater than the maximum windshield curvature (FIG. 1). Under pressure (arrow 18), the wiping lip 22 of the wiper blade 10 presses its entire length against the windshield surface 20. In the process, tension builds up in the metal flexible spring support element 12, ensuring proper seating of the wiper strip 14, which is made of a elastic rubber material, and its wiping lip 22 along its entire length against the windshield surface 20, as well as ensuring an even distribution of pressure (arrow 18). A wind deflection strip 24 is placed at the upper belt surface 11 of the support element 12 facing away from the windshield 20, said wind deflection strip extending in this exemplary embodiment along the entire length of the wiper blade. The wind deflection strip 24 has a uniform cross section along its length in all exemplary embodiments described below. So as to be able to connect the section 15 of the wiper blade connector to the wiper blade, the wind deflection strip 24 is provided in its center section with an area of removal 26 (FIG. 1). The wind deflection strip 24 is intended to ensure that the wiper blade 10 and its wiping lip 22 is held against the windshield 20 with the specified pressure (arrow 18) even at high vehicle speeds.

Below, special configurations of the wiper blade according to the invention will be described in more detail.

The cross section through the wiper blade shown in FIG. 2 along the line II-II in FIG. 1 shows the wiper blade in a pre-assembled state, as only the wiper strip 14 has been placed between the two flexible rails 28 belonging to the support element 12. The two flexible rails 28, which sit in a common plane, are placed at a distance from one another so that a longitudinal slot 32 results between the inner strip edges 30 of the flexible rails 28 that face one another, said slot having a slot width 34. The wiper strip 14 located at the lower belt surface 13 of the support element 12 extends through the longitudinal slot 32 by means of a stem-like continuation 36—the width of which is somewhat smaller than the width 34 of the longitudinal slot 32—and broadens back to the shape of a belt at the upper belt surface 11 after penetrating the longitudinal slot of the support element 14. By way of this belt-like broadening 37, the inner strip edges 30 of the flexible rails 28 are covered so that longitudinal holding notches 38 result to hold the inner strip edges 30 of the support element 12. Since both of its flexible rails 28 are fixed in the position shown in FIG. 2 by means not explained in more detail, a freely moving connection between the support element 12 and the wiper strip 14 results in the longitudinal direction with respect to the support element, said connection not able to come loose inadvertently. However, this connection permits an excellent adjusting of the wiping lip 22 to the shape of the windshield 20 to be wiped. FIG. 2 shows further that the wind deflection strip 24 is located on the upper belt surface 11 of the support element. The wind deflection strip has an essentially tubular triangular cross sectional contour, the first side 40 of which faces in the direction of the support element 12. The second side 42 of the wind deflection strip is provided with a concavity 44 that faces the main airflow stream during wiping operation. The third side 45 completes the wind deflection strip 24 and stabilizes it. Sides 40, 42 and 45 at the exterior of walls, results in a lightweight, hollow wind deflection strip 24. As the pre-assembled position of the wind deflection strip 24 shown in FIG. 2 shows, it has a notched recess 46 on its first triangular side 40, the cross sectional profile of which is matched with the cross sectional profile of the belt-shaped broadening 37 of the continuation 36. In this way, the belt-shaped broadening 37 forms a positive profile shape with which a corresponding negative profile shape 46 of the wind deflection strip 24 fits snugly. The wind deflection strip 24 can thus be placed snugly onto the continuation 36, 37 of the wiper strip 14. This results in a secure fix between the wiper strip 14 provided with the support element 12 and the wind deflection strip 24 as seen in the longitudinal direction of the wiper blade 10. To connect these two components 14 and 24 securely together, their mutual contact surfaces are treated with an adhesive 48 in this exemplary embodiment, by means of which a practically permanent connection is achieved (FIG. 2). Of course, it is also conceivable to achieve the connection between the two components 14 and 24 in another way known to one trained in the art, for example by vulcanization or lasing. If the wind deflection strip 24 is connected permanently to the wiper strip 14, a wiper blade cross-section results as shown in FIG. 3. Further, FIG. 3 shows that the match between the thickness of the belt-shaped broadening 37 and the depth of the notched recess 46 in the wall 40 is dimensioned such that an air gap 50 remains between the flexible rails 28, whose exterior strip edges 31 extend out of the longitudinal holding notches 38, and the first wall side 40 of the support element 24 facing them. This prevents the existence of a large area of contact between the wind deflection strip 24 and the support element 12 that could possibly disrupt the wiping action of the wiper blade 10.

If especially high wind deflection strip loads are expected—for example an especially high incident pressure on the second side 42 of the wind deflection strip 24—, it can be useful to place knife-edge shaped stops 52 on at least one or on both longitudinal edges of side 40 opposite one another, said stops being especially visible in a detailed enlargement shown in FIG. 4. These knife-like stops 52, which form minute surfaces or lines of support for the wind deflection strip, can be also be subdivided into small longitudinal sections or into raised points that also then act as supports or stops when the wind deflection strip is loaded very strongly in the direction of arrow 53.

In high loads on the wind deflection strip 24, it can also be useful to provide the first wall side 40 of the wind deflection strip 24 with longitudinal grooves 54 that act to practically enlarge the air gap 50 in FIG. 3. It is clear that the stops or supports 52 do not necessarily have to be provided on both longitudinal edges of the wind deflection strip 24. In many cases, it can be sufficient if the support only exists at the longitudinal side that is opposite the second wall side 42 of the wind deflection strip 24 provided with the concavity 44.

Another embodiment of the wiper blade according to the invention shown in FIG. 6 provides that a stem-like continuation 61 is placed at the first wall side 60 of the wind deflection strip 59 that faces the flexible rails. The width of the continuation is matched with the slot width 34 of the support element 12. This continuation penetrates the support element 12 in the longitudinal slot 32 remaining between the two flexible rails 28 (FIG. 2) and is then formed into a belt-shaped broadening 62 that reaches under the inner strip edges 30 of the flexible rails 28 that face one another so as to form longitudinal holding notches (63) for the flexible rails (28). The belt-like broadening 62 forms a positive profile shape to which a negative profile shape in the wiper strip 66 is matched that is designed as a notched recess 64 on a wall facing the flexible rails (28). This results in a shape lock between the wiper strip (66) and the wind deflection strip (59) that corresponds in its effect to the shape lock already described above in FIG. 2. The difference between the embodiment described there and the embodiment illustrated in FIG. 6 is only that in the embodiment according to FIG. 6, the positive profile shape 62 is located on the wind deflection strip (59) to which a negative profile shape 64 on the wiper strip 66 is matched. This makes it possible for there to be advantages with regard to the flexibility of the wiper blade.

In addition to the wind deflection strip 69 and the wiper strip 66, there is a separate third bar-shaped component 70 in the embodiment according to FIG. 7. In this embodiment, the design of the wind deflection strip 69 corresponds to the embodiment illustrated in FIG. 2. On the other hand, the cross sectional shape of the wiper strip (66) corresponds to the wiper strip design according to FIG. 6. Thus, both the wind deflection strip 69 as well as the wiper strip 66 is provided with a notched recess 46 and 64, respectively. The bar-shaped component 70 has a longitudinal notch 72 at two opposite longitudinal sides for the purposes of holding the inner strip edges 30 of the flexible rails 28 that face one another, said longitudinal notches lying in a common plane. Between the two longitudinal notches 72 remains a stem 74 whose width is matched according to the requirements of the slot width 34 (FIG. 2). The width of the longitudinal notches 72 is matched to the thickness of the flexible rails. If the bar-shaped third component 70 is first connected to either the wind deflection strip 69 or to the wiper strip 66 in the manner shown in FIG. 7, what results is either a cross sectional embodiment according to FIGS. 2 and 3 or an embodiment according to FIG. 6. The third component 70 is thus first connected to one of the two other components 66 [through] 69, for example glued, so that it is then a part of it. Then, the further assembly is done according to FIG. 2 or according to FIG. 6. The special advantage of this embodiment is in that the material selection for the bar-shaped component 70 can be tailored entirely according to the demands of low-friction slip insertion into the support element 12.

It should be noted concerning the embodiments according to FIGS. 6 and 7 that here, as well, stops 52 can be placed on the bottom of the wind deflection strip 59 opposite the support element 12 which, at high tipping loads on the wind deflection strip that push it to its side opposite the concavity 44, act as small surface area supports at the upper belt surface 11 of the support element 12.

The embodiments of a wiper blade according to the invention shown in FIGS. 8 through 13 stand out particularly by the fact that they have no actual first wall side at the support element, which reduces the weight of the wiper blade. The wind deflection strip 78 according to FIGS. 8 and 9—as seen in the cross section—has two sides 81, 83 diverging out from a common base 79 that extend up to the support element 12. Formed onto the inner wall of each of the two sides 81, 83 is a latch hook 80 that extends toward the exterior strip edges 31 of the support element 12 that are directly adjacent to it, respectively, wherein the two latch hooks 80 together constitute the positive profile shape. An opposite hook 84 located on the continuation 82 of the wiper strip 85 is mated to each of the two latch hooks 80, said opposite hooks together constituting the negative profile shape. To create the opposite hook 84, the continuation 82 of the wiper strip 85 that transitions into a broadened section has a longitudinal notch 86 at its longitudinal walls facing one another where the two opposite-facing hooks 84 are designed. In order to connect the wind deflection strip shown in FIG. 9 to the wiper strip 85 (in comparison with FIG. 8), which is in a pre-assembled position, the two sides 81, 83 of the wind deflection strip 78 are for example pressed together in the direction of the two arrows 88 until the wind deflection strip can be assembled in its operating position shown in FIG. 8 without difficulty. Also, in this embodiment, it can be sensible to provide at least the longitudinal side of the side 83 that faces away from the concavity 44 of the wind deflection strip with the support elements 52 already mentioned.

Figure 10:
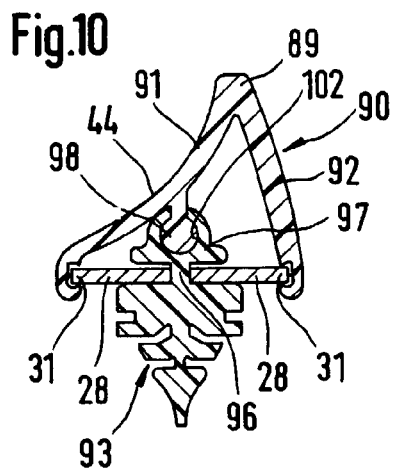
FIG. 10—a section according to FIG. 3 through another embodiment of the wiper blade.
Figure 11:
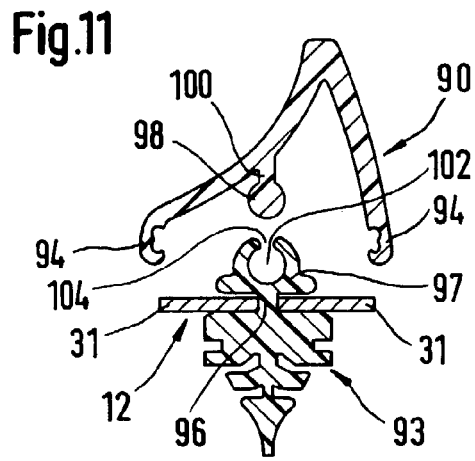
FIG. 11—a section through the wiper blade according to FIG. 10 shown in a pre-assembled position.

In the embodiment according to FIGS. 10 and 11, the wind deflection strip 90 also has two diverging sides 91, 92 as seen in cross section, wherein the outside of side 91 is provided with a concavity 44. The two sides 91 and 92 are connected at a common base 89 together. The two free ends of the sides that face the support element 12 are supported off of the support element 12. In the process, in this embodiment, a claw-like extension 94 is formed onto each side end that snugly wraps around the outer strip edges 31 of the support element 12. To reduce friction, there are also knife-edged or pointed support means provided where contact can occur between the support element 12 and the wind deflection strip 90. On the inner wall of the side 91 that faces the continuation 96 of the wiper strip 93, i.e. its broadening zone 97, is a disc shaped or round strip 98 as a positive profile shape that is connected side 91 along a narrow longitudinal stem 100. The negative profile shape formed on the continuation 96 is created by a longitudinal notch 102 that is circular in cross section and that is provided on its side facing the wind deflection strip 90 with a slotted longitudinal opening 104 that is matched with the thickness of the longitudinal stem 100. In order to ensure the safe seating of the wind deflection strip 90 onto the continuation 96 of the wiper strip 93, the diameter of the strip 98 is matched accordingly to the diameter of the longitudinal notch 102. The installation of the wind deflection strip 90 is done in the longitudinal direction of the wiper blade, with the strip 98 being inserted into the longitudinal notch 102. At the same time, the exterior strip edges 31 of the support element 12 also slide into the claw-like extensions 94 of the wind deflection strip 90 (FIG. 10).

Figure 12:
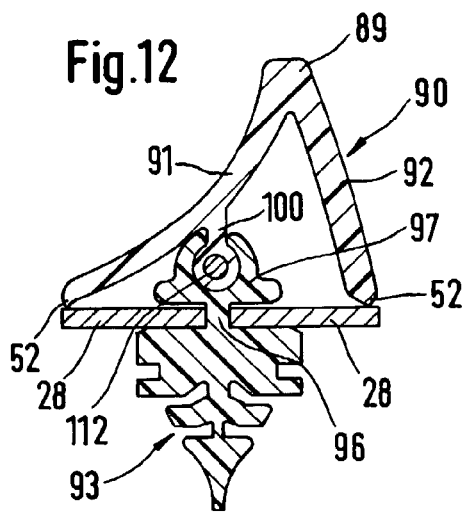
FIG. 12—a section according to FIG. 3 through another embodiment of the wiper blade.
Figure 13:
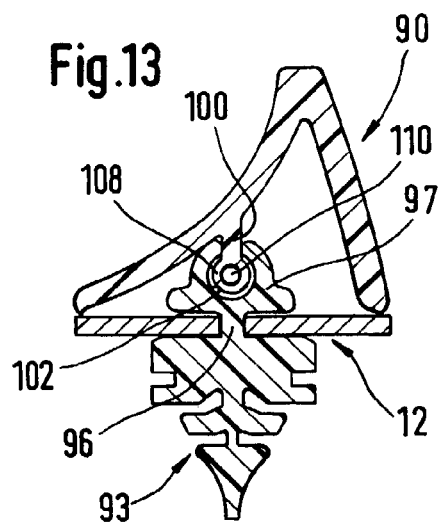
FIG. 13—the wiper blade according to FIG. 12 shown in a pre-assembled position.

A variation of the embodiment just described is explained below with the help of FIGS. 12 and 13. This differs from the embodiment according to FIGS. 10 and 11 in that the strip 108 that is circular in cross section is provided with a longitudinal hole 110 and that the diameter of this strip 108 is smaller than the diameter of the longitudinal notch 102. After attaching the wind deflection strip 90 to the wiper strip 14, i.e. to its continuation 96, 79, a bar 112 is inserted into the longitudinal hole 110 of the strip 108 (FIG. 12) whose diameter is larger than the diameter of the longitudinal hole 110. This causes the strip 108 to expand to make up the difference between the diameter of the strip 108 and the diameter of the longitudinal notch 102; in other words, the diameter of the positive profile shape 108 is expanded to the diameter of the negative profile shape 102.

After connecting the two parts 90 and 93, a permanently secure shape-locked connection is guaranteed since the strip 98, 108, which is considered as a positive profile shape, is enveloped by the continuation 98, which is considered as the negative profile shape, by more than 180°. In the embodiment according to FIGS. 12 and 13, the support elements 52 provided at the free ends of the sides 91 and 92 are located similarly according to the embodiment of FIGS. 8 and 9.

In order to make cost-effective manufacture of the wiper blade possible, the cross sections of the two components 14 and 24, which are made of an elastic material, are each uniform along their entire length. Regardless of this, however, partial areas of removal can be made after the extrusion of these components if this is seen to be useful for certain reasons. Also in the embodiments according to FIGS. 8 through 13, it can be sensible, exactly as already described through the embodiments according to FIGS. 2 through 7, that the wind deflection strip and the wiper strip are provided at their point of connection with an adhesive in order to also counteract especially high loads.

The variously described embodiments each have a number of advantageous features in and of themselves or in various combinations as well. An important feature that is common to all of them is that two components of the wiper blade—the wiper strip and the wind deflection strip—are connected together at their sides facing one another. In a wiper blade that has a wiper strip support element having two flexible rails that are separated from one another it is especially advantageous if these two components are connected together via the longitudinal slot remaining between the flexible rails. In the process, an especially production-friendly connection between the two components can be achieved by extending one of the two components having a stem-like continuation along the longitudinal slot to the belt surface of the support element that it faces away from, and furthermore by connecting the two components to one another at the continuation. It is especially advantageous if, moreover, according to a valuable further development of the invention concept, the continuation of one component has a positive profile shape, as seen in cross section, with which a negative mating profile shape, as seen in cross section, of the other component associates that is matched with it.

By connecting the wind deflection strip alone to the wiper strip—in any case with supports at the support element—an undisturbed relative motion between the support element on the one hand and the wind deflection strip or the wiper strip on the other hand is ensured. Also, aging or environmentally caused length changes of the non-metallic parts are easily compensated this way. Also beneficial is the position of the connection weld near a plane that intersects the "neutral thread" of these parts.

What is claimed is:

1. A wiper blade (10) to clean windshields (20), in particular of automobiles, provided with an elongated belt-shaped, flexible spring support element (12) having top and bottom belt surfaces, with a separate first component designed as an elastic rubber wiper strip (14) that can be pressed against the windshield (20) located at the bottom belt surface (13) of the support element and with a separate second component located at the top belt surface (11) of the support element (12) that is designed as a wind deflection strip (24) that extends at least along a longitudinal section of the wiper blade (10), characterized in that the two components (14, 24) are directly and securely connected together at their sides facing one another, wherein support element (12) has two flexible rails (28) at a distance from one another, characterized in that the two components (14, 24) are connected together through a longitudinal slot (32) remaining between the flexible rails.

2. A wiper blade according to claim 1, characterized in that one of the two components (14, 24) extends through the longitudinal slot (32) by means of a stem-like continuation (36) to a side of the support element (12) opposite said component and that the connection of the two components with one another is achieved at the continuation (36).

3. A wiper blade according to claim 2, characterized in that the continuation (36) of the first component has a profile shape, as seen in cross section, that matches a mating profile shape on the other component as seen in a cross section.

4. A wiper blade according to claim 3, characterized in that the stem-like continuation (36) is located at a wall of the wiper strip (14) facing the flexible rails, that the continuation broadens into a belt shape after penetrating the longitudinal slot (32) to create longitudinal holding notches (38) for the flexible rails (28), and that it covers inner strip edges (30) of the flexible rails (28) that face one another.

5. A wiper blade according to claim 4, characterized in that the belt-like broadening (37) of the continuation (36) creates a positive profile shape with which a negative profile shape designed as a notched recess (46) snugly fits.

6. A wiper blade according to claim 5, characterized in that the notched recess (46) is designed into a wall (40) of the wind deflection strip (24) that faces the flexible rails (28).

7. A wiper blade according to claim 4, characterized in that external strip edges (31) of the two flexible rails (28) of the support element (12) facing away from one another protrude at least part of the way out from their longitudinal holding notches (38) and that between the flexible rails and the wall of the wind deflection strip (24) that faces them, there is an air gap (50) that remains.

8. A wiper blade according to claim 7, characterized in that the wind deflection strip (24) is supported at the support element (12) by knife-edge stops (52) located at its longitudinal edges.

9. A wiper blade according to claim 3, characterized in that the cross section of the wind deflection strip (24, 59, 69, 78, 90) and the wiper strip (14, 66, 85, 93) are uniform along their entire respective lengths.

10. A windshield wiper blade comprising
an elongated belt-shaped, flexible spring support element having top and bottom surfaces and having a longitudinal slot,
a wind deflection strip that is located above the top surface of the support element and that extends at least along a longitudinal section of the wiper blade, and
an elastic rubber wiper strip that can be pressed against a windshield and that is located below the bottom surface of the support element, the wiper strip having a narrow portion extending through the slot of the support element to be directly and securely connected to the wind deflection strip, the wiper strip also having a wider portion connected to the narrow portion, the wider portion facing the top surface of the support element.

11. A wiper blade according to claim 10, wherein the wind deflection strip has therein a recess, and the wiper strip has a portion received in the recess for securing the wind deflection strip to the wiper strip and the support element.

12. A wiper blade according to claim 11 wherein the wind deflection strip is generally triangular in cross section and has a lower surface having therein the recess.

13. A wiper blade according to claim 12 wherein the wind deflection strip is hollow and has a bottom wall having therein the recess.

14. A wiper blade according to claim 10 wherein one of the wiper strip and the wind deflection strip has therein a recess, and the other of the wiper strip and the wind deflection strip has thereon a projection received in the recess for securing the wind deflection strip to the wiper strip and the support element.

15. A wiper blade (10) to clean windshields (20), in particular of automobiles, provided with an elongated belt-shaped, flexible spring support element (12), which has two flexible rails (28) at a distance from one another, with a separate first component designed as an elastic rubber wiper strip (14) that can be pressed against the windshield (20) located at the bottom belt surface (13) of the support element, which component has longitudinal holding notches (38) for the flexible rails (28), and with a separate second component located at the other upper belt surface (11) of the support element (12) that is designed as a wind deflection strip (24) that extends at least along a longitudinal section of the wiper blade (10), characterized in that the two components (14, 24) are directly and securely connected together at their sides facing one another and external strip edges (31) of the two flexible rails (28) of the support element (12) facing away from one another protrude at least part of the way out from their longitudinal holding notches (38) and that between the flexible rails and the wall of the wind deflection strip (24) that faces them, there is an air gap (50) that remains.

* * * * *